United States Patent
Natarajan et al.

(10) Patent No.: US 9,896,207 B2
(45) Date of Patent: Feb. 20, 2018

(54) PRODUCT DELIVERY METHODS AND SYSTEMS UTILIZING PORTABLE UNMANNED DELIVERY AIRCRAFT

(71) Applicant: Wal-Mart Stores, Inc., Bentonville, AR (US)

(72) Inventors: Chandrashekar Natarajan, San Ramon, CA (US); Donald R. High, Noel, MO (US)

(73) Assignee: Wal-Mart Stores, Inc., Bentonville, AR (US)

(*) Notice: Subject to any disclaimer, the term of this patent is extended or adjusted under 35 U.S.C. 154(b) by 0 days.

(21) Appl. No.: 15/346,030

(22) Filed: Nov. 8, 2016

(65) Prior Publication Data

US 2017/0137128 A1 May 18, 2017

Related U.S. Application Data

(60) Provisional application No. 62/255,042, filed on Nov. 13, 2015.

(51) Int. Cl.
*B64D 1/22* (2006.01)
*B64D 47/08* (2006.01)
(Continued)

(52) U.S. Cl.
CPC .............. *B64D 1/22* (2013.01); *B64C 39/024* (2013.01); *B64D 47/08* (2013.01); *B64F 1/20* (2013.01);
(Continued)

(58) Field of Classification Search
CPC ... B64C 2201/128; B64C 39/024; B64D 1/22; B64D 47/08; B64F 1/20; B66C 23/18;
(Continued)

(56) References Cited

U.S. PATENT DOCUMENTS 7,848,830 B1 12/2010 Gromley
8,948,935 B1 2/2015 Peeters
(Continued)

OTHER PUBLICATIONS

Alba, Alejanddro; "See it: Crocs Opens Pop-Up Shoe Store in Tokyo Staffed by Drones"; New York Daily News; http://www.nydailynews.com/news/world/crocsshoestoretokyostaffed-dronesarticle1.2138848; Mar. 5, 2015; pp. 1-7.

(Continued)

*Primary Examiner* — Tyler J Lee
(74) *Attorney, Agent, or Firm* — Fitch, Even, Tabin & Flannery LLP

(57) ABSTRACT

In some embodiments, provide systems, apparatuses and methods to deliver products using unmanned delivery aircraft. In some embodiments, product delivery system is provided, comprising: an unmanned delivery aircraft configured to deliver a package to a package drop point corresponding to a location of a vehicle at a predefined drive-through station, wherein the delivery aircraft comprises: one or more cameras; an image processor configured to process images captured by the one or more cameras and based on the processing of the images confirm a precise location of the package drop point as defined according to a determined current location and an orientation of the vehicle; and a crane system that supports the first package and lowers the first package to the package drop point relative to the current location and orientation of the vehicle while the delivery aircraft hovers above the vehicle by a threshold distance.

18 Claims, 3 Drawing Sheets

(51) Int. Cl.
*G06K 9/00* (2006.01)
*B64F 1/20* (2006.01)
*G01S 19/13* (2010.01)
*G06Q 10/08* (2012.01)
*B64C 39/02* (2006.01)
*G05D 1/00* (2006.01)
*B66C 23/18* (2006.01)

(52) U.S. Cl.
CPC ............ G01S 19/13 (2013.01); G05D 1/0011 (2013.01); G06K 9/0063 (2013.01); G06Q 10/0832 (2013.01); *B64C 2201/128* (2013.01); *B66C 23/18* (2013.01)

(58) Field of Classification Search
CPC .... G01S 19/13; G05D 1/0011; G06K 9/0063; G06Q 10/0832
USPC .......................................................... 701/2
See application file for complete search history.

(56) References Cited

U.S. PATENT DOCUMENTS

| | | | | |
|---|---|---|---|---|
| 8,965,460 | B1* | 2/2015 | Rao | G06F 3/005 |
| | | | | 455/566 |
| 9,061,102 | B2 | 6/2015 | Levien | |
| 9,244,147 | B1* | 1/2016 | Soundararajan | G01S 1/44 |
| 9,689,686 | B1* | 6/2017 | Carmack | G01C 21/20 |
| 2010/0198514 | A1 | 8/2010 | Miralles | |
| 2014/0032034 | A1* | 1/2014 | Raptopoulos | G08G 5/0069 |
| | | | | 701/25 |
| 2014/0149244 | A1* | 5/2014 | Abhyanker | G06Q 10/087 |
| | | | | 705/26.2 |
| 2014/0164126 | A1 | 6/2014 | Nicholas | |
| 2014/0254896 | A1 | 9/2014 | Zhou | |
| 2014/0267793 | A1 | 9/2014 | Wang | |
| 2015/0120094 | A1 | 4/2015 | Kimchi | |
| 2015/0175276 | A1 | 6/2015 | Koster | |
| 2015/0298822 | A1 | 10/2015 | Eline | |
| 2015/0339933 | A1 | 11/2015 | Batla | |
| 2016/0185466 | A1* | 6/2016 | Dreano, Jr. | G06Q 30/0635 |
| | | | | 705/26.81 |
| 2016/0200438 | A1* | 7/2016 | Bokeno | B64D 1/08 |
| | | | | 244/2 |
| 2016/0235236 | A1* | 8/2016 | Byers | A47G 29/14 |
| 2016/0236778 | A1* | 8/2016 | Takayama | B64D 1/12 |
| 2016/0257423 | A1* | 9/2016 | Martin | B64F 1/00 |
| 2017/0011340 | A1* | 1/2017 | Gabbai | G06Q 10/0836 |
| 2017/0038780 | A1* | 2/2017 | Fandetti | G05D 1/104 |

OTHER PUBLICATIONS

Ellis, Danny; "Using Technology to Promote Safety for Drones, Pilots and Bystanders Aug. 21, 2015"; https://www.insidedrones.com/blog/b6mkc/UsingTechnologytoPromoteSafetyforDrones,Pilots; Sep. 9, 2015; pp. 1-5.

Rushe, Dominic; "Google Reveals Home Delivery Drone Program Project Wing"; The Guardian; http://www.theguardian.com/technology/2014/aug/29/googlejoinsamazonintestinghomedeliverydrones; Aug. 29, 2014; pp. 1-6.

PCT; App. No. PCT/US2016/60954; International Search Report and Written Opinion dated Jan. 30, 2017.

* cited by examiner

PRODUCT DELIVERY METHODS AND SYSTEMS UTILIZING PORTABLE UNMANNED DELIVERY AIRCRAFT

CROSS-REFERENCE TO RELATED APPLICATION

This application claims the benefit of U.S. Provisional Application No. 62/255,042, filed Nov. 13, 2015, and is incorporated herein by reference in its entirety.

TECHNICAL FIELD

This invention relates generally to product deliveries using unmanned delivery aircraft.

BACKGROUND

In a modern retail environment, there is a need to improve the customer service and/or convenience for the customer. One aspect of customer service is the delivery of products. There are numerous ways to delivery products to customers. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining the delivery of products to vehicles using unmanned delivery aircraft. This description includes drawings, wherein.

Figure 1:
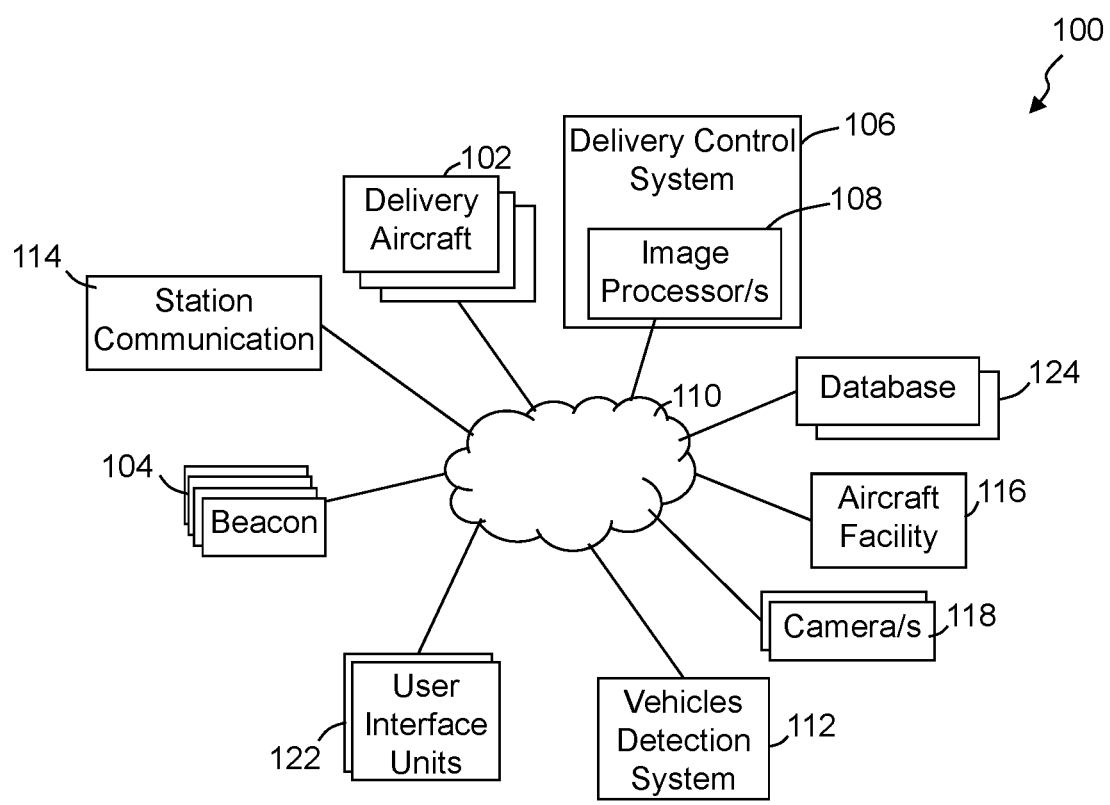
FIG. 1 illustrates a simplified block diagram of an exemplary product delivery system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to deliver products to customers' vehicles using unmanned delivery aircrafts (UDA). In some embodiments, provide unmanned delivery aircraft system that includes multiple unmanned delivery aircrafts that are configured to carry one or more packages each containing one or more products to be delivered to a package drop point corresponding to a location of a vehicle at one of one or more predefined drive-through stations associated with a shopping facility. The delivery aircrafts include one or more cameras that are positioned and/or can controlled to be positioned to capture one or more images and/or videos of at least the drive-through station and the vehicle waiting at the drive-through station. The one or more cameras can be activated when the unmanned delivery aircraft is above the drive-through station and/or when the delivery aircraft is within a threshold distance of the drive-through station. The delivery aircrafts further typically include an image processor that receives the one or more images and/or video captured by the one or more cameras of the delivery aircraft and configured to process the images captured by the one or more cameras. Based on the processing of the images and/or video, the delivery aircraft can confirm a precise location of a package drop point as defined according to a determined current location and an orientation of the vehicle. In some implementations, the delivery aircraft further includes a crane system that supports the package to be delivered. The crane can be activated to lower the package to the package drop point relative to the current location and orientation of the vehicle while the delivery aircraft hovers above the vehicle by a threshold distance.

FIG. 1 illustrates a simplified block diagram of an exemplary product delivery system 100, in accordance with some embodiments. The product delivery system includes multiple unmanned delivery aircrafts 102 (sometimes referred to as unmanned aerial vehicles (UVA)), multiple beacons 104, and a delivery control system 106 that are communicatively coupled through one or more distributed communication network 110. In some implementations, the product delivery system 100 includes one or more vehicle detection systems 112 that are associated with one or more drive-through stations. One or more station communication systems 114 may further be provided corresponding to one or more drive-through stations. Typically, the product delivery system 100 includes a delivery aircraft facility 116 that stores and maintains the delivery aircraft. One or more shopping facility cameras 118 may communicate images and/or video to the delivery control system 106 and/or the delivery aircrafts 102. Further the product delivery system can communicate with and/or include one or more user interface units 122. One or more of the components of the product delivery system 100, such as delivery control system 106, may further include and/or communicatively couple with one or more databases 124 (e.g., over the communication network 110).

The delivery aircraft 102 are unmanned aircraft configured to autonomously fly between one or more load stations and the one or more drive-through stations. This allows customers to temporarily park in one of the drive-through stations and have one or more products carried by one or more delivery aircraft to the drive-through station and customer's vehicle. The delivery aircraft are in communication with the delivery control system 106 to receive relevant delivery information, such as drive-through station identifier, flight path and/or route information, commands, parameters, images, confirmations and the like. Similarly, the delivery aircrafts can further communication information to the delivery control system 106, such confirmation of delivery, images and/or video, error conditions, operating parameters information, and other such information.

The delivery control system 106 is configured to identify one or more products to be delivered to a customer at a drive-through station. In some instances, the delivery control system receive customer identification information of a customer at one of the drive-through stations. Using the customer identification information, the delivery control system can identify one or more products to be delivered to the customer. In other instances, a customer may submit a purchase request while at the drive-through station. The delivery control system directs one or more workers to cooperate the one or more products to a delivery aircraft 102, which then flies to the corresponding drive-through station and delivers the one or more products.

Figure 2:
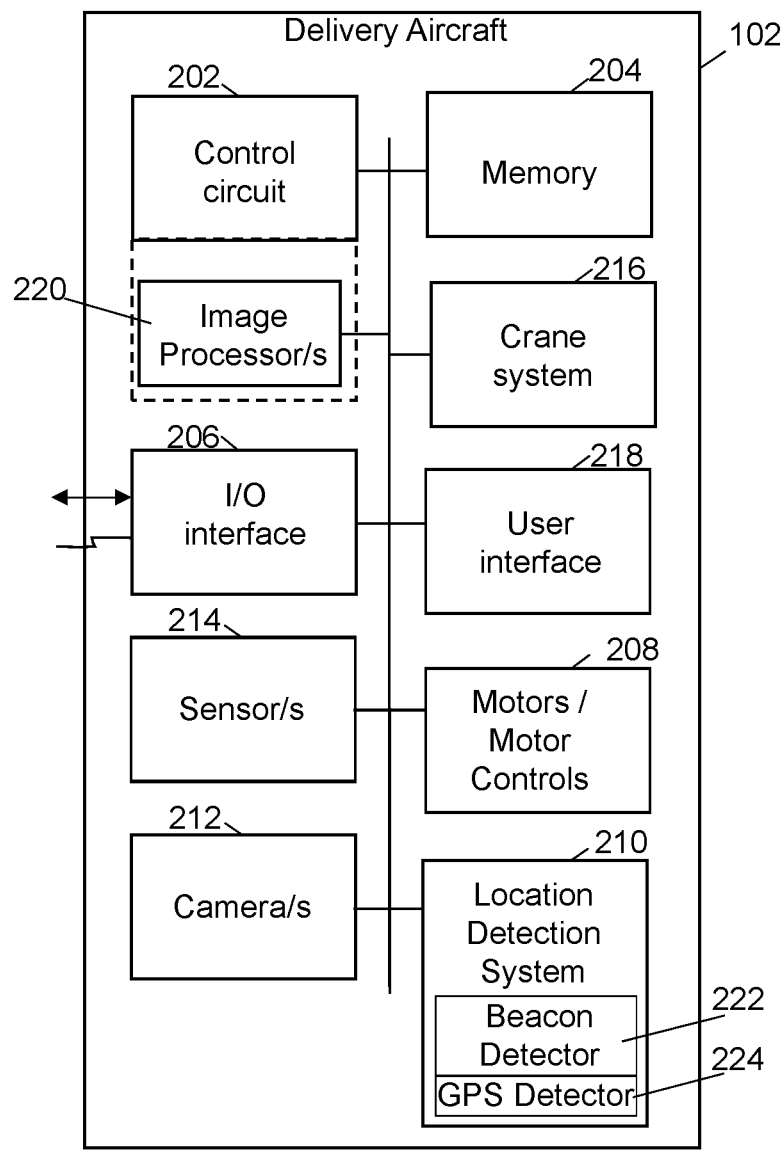
FIG. 2 illustrates a simplified block diagram of an exemplary unmanned delivery aircraft, in accordance with some embodiments.

FIG. 2 illustrates a simplified block diagram of an exemplary unmanned delivery aircraft 102, in accordance with some embodiments. The delivery aircraft includes one or more control circuits 202, memory 204, input/output (I/O) interfaces and/or devices 206, motors and motor control circuitry 208, location detection systems 210, and one or more cameras 212. Some embodiments further include one or more sensors 214, a crane system 216, a user interface 218, and/or other such systems.

The control circuit 202 typically comprises one or more processors and/or microprocessors and couples with the memory 204 that stores operational codes or sets of instructions that are executed by the control circuit 202 and/or processor to implement the functionality of the delivery aircraft 102. For example, in some applications, the control circuit may include and/or couple with one or more image processors 220 that provide image processing of at least images, which may include video processing, captured by one or more cameras 212 of the delivery aircraft 102. In some embodiments, the memory 204 may also store some or all of particular data that may be needed to at least navigate between at least one or more launch locations and the one or more drive-through stations and deliver one or more products.

It is understood that the control circuit 202 may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the delivery aircraft 102; however, the memory 204 can be internal, external and wirelessly accessible, or a combination of internal and external memory. Additionally, the delivery aircraft typically includes one or more power supplies (not shown) that is typically rechargeable, and/or it may receive power from an external source. While FIG. 2 illustrates the various components being coupled together via a bus, it is understood that the various components may actually be coupled to the control circuit 202 and/or one or more other components directly.

Generally, the control circuit 202 and/or electronic components of the delivery aircraft 102 can comprise fixed-purpose hard-wired platforms or can comprise a partially or wholly programmable platform. These architectural options are well known and understood in the art and require no further description here. The delivery aircraft and/or control circuit can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the delivery aircraft 102 to external components, such as delivery control system 106, vehicle detection system 112, aircraft facility system 116, databases 124, user interface units 122 (e.g., smart phone, tablet, optical head-mounted display systems, smart watch systems, and other such consumer electronic user devices), in some instances one or more other delivery aircraft, and other such devices or systems. Typically, the I/O interface 206 provides at least wireless communication (e.g., cellular, Wi-Fi, Bluetooth, RF, and/or other such wireless communication), and in some instances may include any known wired and/or wireless interfacing device, circuit and/or connecting device, such as but not limited to one or more transmitter, receiver, transceiver, etc.

The location detection system 210 obtains location information to determine a current location of and track the location and movements of the delivery aircraft. The control circuit 202 utilizes the location information in controlling the movements of the delivery aircraft. In some instances, the location detection system may include a global positioning detection system and/or system that received global positioning coordinate information, Wi-Fi signal triangulation and/or evaluation system, cellular tower triangulation system, and/or other such location detection system. In some embodiments, the location detection system 210 includes and/or couples with one or more beacon signal detectors that receives beacon signals from multiple beacons 104 at known locations distributed around the one or more drive-through stations and/or other areas associated with a shopping facility (e.g., one or more distributed at known locations of a parking lot, at known locations relative to the aircraft facility 116, at known locations relative to the building of the shopping facility, and/or other such locations), global positioning satellite (GPS) system, and/or other such location information acquisition systems. Further, the location detection system may use information provided by one or more sensors 214 in determining and/or tracking location information. The sensors can include substantially any relevant sensor such as, but not limited to, one or more inertial sensors, accelerometers, altimeters, gyroscopes, compass, distance measurement systems (e.g., ultrasound, laser, etc.), and/or other such sensor information. Other sensors 214 may be included that may or may not be used for location detection, such as but not limited to wireless signal strength sensor, weather sensors, and the like.

The delivery aircrafts 102 further include one or more cameras 212 that capture images and/or video that can be evaluated by the control circuit 202 of the delivery aircraft and/or communicated to the delivery control system 106 for processing, and/or other systems. In operation, the control circuit 202 of the delivery aircraft can activate one or more of the cameras 212, and in some implementations activates a cameras based on a predefined delivery sequence (e.g., when within a threshold distance of a drive-through station activate a camera to capture images and/or video, when hovering over a drive-through station, while lower the product by a crane system 216, and the like), in response to a command from the delivery control system, and the like. Some embodiments include different cameras directed in different general directions (e.g., up, down, forward, backwards), additionally or alternatively, one or more cameras may be cooperated with camera directional control systems (e.g., motors, tracks, gimbals, etc.) that can control the movement of one or more cameras. In some embodiments, one or more pictures and/or video captured by the camera/s 212 of the delivery aircraft can be evaluated for one or more parameters, rules and/or conditions. For example, one or more images and/or video can be captured by the delivery aircraft of a drive-through station, and can be evaluated to identify and/or confirm a location of a vehicle parked within the drive-through station, identify and/or confirm a package drop point, determine whether delivery should commence and/or continue based on one or more rules and/or conditions, and other such actions.

In some implementations, an unmanned delivery aircraft 102 may include a crane system 216 that allows a product being delivered to be lowered to the delivery site while the delivery aircraft hovers over a drive-through station and corresponding package drop point, and typically hovers at or above a threshold height above the drive-through station. As such, the delivery aircrafts 102 in at least some embodiments have the ability to autonomously deliver one or more packages, products and/or cargo to an intended package drop point without having to physically land the delivery aircraft. In some implementations, the delivery aircraft can be controlled to maintain a stable hover above an intended package drop point (e.g., around 10-50 feet off above the intended package drop point and/or the ground). Maintaining the aircraft at an elevation can make the delivery safer to both humans, animals, property, and the like, for example because they would not encounter the spinning propellers of the delivery aircraft. The delivery aircraft, while hovering, can lower the package through a crane system 216. The crane system can include, for example, a crane motor that cooperates with a rotational drive shaft that is rotated by the crane motor, with one or more reels, spools or the like selectively cooperated with the drive shaft. Each crane system typically includes at least one cord, cable, rope, or the like that is unspooled and retracted through the rotation of a corresponding spool. The cord can be spooled out by the crane system to lower the package to the delivery site while the delivery aircraft 102 hovers over the delivery site. The control circuit 202 and/or a control circuit of the crane system can control the decent of the package by controlling a rate at which the delivery aircraft drops in elevation and/or controls the rate of spooling by the crane system in lowering the package. In some applications the crane system further includes and/or cooperates with a package release system. In some embodiments, the control circuit 202 triggers the release of a package, while in other implementations the package release system is a mechanical release without need of communication to trigger the release. The crane system, the delivery aircraft and/or the release system may in some embodiments be implemented in accordance with or similar to the delivery aircraft, crane systems, and/or release system described in co-pending U.S. Provisional Application No. 62/222,572, for Nathan G. Jones et al., filed Sep. 23, 2015, and entitled SYSTEMS AND METHODS OF DELIVERING PRODUCTS WITH UNMANNED DELIVERY AIRCRAFTS, and U.S. Provisional Application No. 62/222,575, for Nathan G. Jones, filed Sep. 23, 2015, and entitled PACKAGE RELEASE SYSTEM FOR USE IN DELIVERY PACKAGES, AND METHODS OF DELIVERING PACKAGES, which ARE incorporated herein by reference in their entirety.

In some implementations, the delivery aircraft may include one or more user interfaces 218 that can be used for user input and/or output display. For example, the user interface 218 may include any known input devices, such one or more buttons, knobs, selectors, switches, keys, touch input surfaces, audio input, and/or displays, etc. Additionally, the user interface 218 includes one or more output display devices, such as lights, visual indicators, display screens, etc. to convey information to a user. Similarly, the user interface 218 in some embodiments may include audio systems that can receive audio commands or requests verbally issued by a worker, and/or output audio content, alerts and the like.

In some applications, the control circuit 302 of the delivery aircraft 102, and/or the control circuit 202 of a delivery control system 106 further receive one or more delivery aircraft images and/or video captured by one or more cameras on the delivery aircraft 102 while the delivery aircraft is positioned within a delivery distance threshold from a determined package drop point. The one or more images and/or video from the delivery aircraft can be evaluated relative to one or more delivery rules (sometimes referred to as parameters and/or conditions). These delivery rules can include substantially any rule relative to human and/or animal safety, product safety, delivery aircraft safety, legal issues, control and/or lack of control issues, other such rules or combinations of two or more of such rules. These rules can include some or all of the conditions, parameters and/or concerns described above with regard to confirming a package drop point and/or whether conditions exist where the delivery system may prevent the delivery. As an example, one or more delivery aircraft images and/or video can be captured and evaluated to confirm there is not any humans and/or animals within a threshold diameter of the package drop point. The delivery can commence when the confirmation is obtained and/or determined, based on the one or more delivery aircraft images and/or video, that one or more delivery rules are satisfied prior to initiating a delivery of the product.

Further, images, video and/or sensor data can continue to be monitored while a product is being delivered. For example, video processing can be performed to detect movement at or within a threshold distance of the package drop point. Based on the detected movement the delivery may be paused and/or terminated. The delivery may be terminated in a condition is not resolved within a threshold period of time. The customer is typically notified that the delivery was aborted and/or paused, and may provide information about why it was paused and/or aborted.

In some applications, the product delivery system is configured to enable delivery of one or more products to a vehicle (e.g., a customer's car) temporarily parked at one of multiple drive-through stations associated with and typically at or near a retail shopping facility. Further, the delivery precision is such that the unmanned delivery aircraft 102 delivery the one or more products at a precise package drop point that is dependent on the precise location of the vehicle, which can include directly on and/or into a portion of the vehicle (e.g., directly into an open trunk of the vehicle. In some embodiments, the product delivery system utilizes unmanned delivery aircrafts 102 that carry one or more packages or cargo, which include one or more products ordered by a customer, to be delivered to a package drop point corresponding to a location of a vehicle at a predefined drive-through station associated with a shopping facility.

The delivery aircraft 102 utilizes one or more cameras positioned to capture images, which may include capturing video, of at least the drive-through station and the vehicle waiting at the drive-through station. The images can be captured while the unmanned delivery aircraft is above the drive-through station. Typically, images can be captured as the delivery aircraft 102 approaches the drive-through station, such as activating the one or more cameras when the delivery aircraft is within a threshold distance from the drive-through station. The images are processed by one or more image processors 220 to determine and/or confirm a precise location of a package drop point as defined according to a determined current location and an orientation of the vehicle. Reference points at predefined locations relative to the drive-through station the vehicle is parted in can be detected through the image processing. Based on the reference points, there relative size within the images, their position relative to the vehicle, and other such factors, the precise location of other vehicle can be determined. The reference points can be fixed structures (e.g., concrete planter boxes, parking space boarders, station communication systems 114, and other such structures), paint on the ground (e.g., parking space lines, directional arrows, grids, and the like), affixed reference points (e.g., reflectors, readily identifiable images and/or shapes, etc.), and/or other such references points. The product delivery system 100 and/or the delivery aircraft 102 have precise location information for the one or more reference points. Additionally, relative distance relationships can be determined based on variations of angles between reference points with respect to the angle at which the image and/or video is captured. Further, the lack of one or more reference points detected in an image and/or video due to the vehicle blocking the one or more reference points can further be considered. Still further, some embodiments detect one or more reference points on the vehicle.

Some embodiments may further detect and/or recognize one or more reference points on the vehicle. These reference points may be structural components of the vehicle (e.g., one or more predefined corners of the vehicle, a location of one or more door handles and/or windows, a wheel, and the like, and/or relationships between components of the vehicle), reference points affixed to the vehicle, other such distinct features, or a combination of two or more of such features. Typically, the reference points do not change position over time. Additionally or alternatively, reference points can be selected based on previous visits by that vehicle to one of the delivery stations. In some instances, one or more reference points can be affixed at precise locations on the vehicle, and/or a precise location of where the reference points are on the vehicle can be determine (e.g., through physical measurements, image processor and known dimensions of the vehicle, and the like). In some applications, specific dimensions of the vehicle are acquired based on a recognition of the vehicle through the image processing, and the dimensions can further be used in determining a precise location of the vehicle relative to the drive-through station.

Typically, the package drop point is not a fixed location drop point. Instead, the package drop points are determined based on the determined location of the vehicle so that the package of one or more products is delivered at a desired location relative to the determined location of the vehicle. Each vehicle that parks at a drive-through station is different, and is further going to be in a different location relative to the drive-through station. Accordingly, the control circuit 202 of the delivery aircraft 102 and/or a control circuit of the delivery control system 106 determine a precise location of the vehicle, and based on that precise location determines a precise location of the package drop point. This can include determining and/or confirming the determined location of the package drop point that is fixed to the vehicle (e.g., in the trunk, in a car top carrier, in the bed of a pickup truck, and/or other such location fixed to the vehicle.

Additionally, in some embodiments, the fixed shopping facility cameras 118 are utilized to capture one or more images, which can include capturing video. The one or more images can be processed by shopping facility image and/or video processors 108 of the delivery control system 106 and/or the delivery aircraft. The image processing can be used in identifying a location and orientation of vehicle relative to the drive-through station. Typically, the one or more shopping facility cameras are positioned relative to and orientated to capture images of the drive-through station. The precise location of the cameras relative to the drive-through stations is typically known and the relationship in images of one or more reference points can be used to determine a location of the vehicle. The shopping facility image processor 108 receives the additional images captured by the shopping facility cameras 118 and can determine a current location and orientation of the vehicle. The determined current location and orientation information of the vehicle can be communicated to the delivery aircraft.

Once the precise location of the vehicle is determined the location of the package drop point is determined based on the location of the vehicle. Again, in some instances, the drop point may be in and/or on the vehicle. In other instances, the package drop point is at a predefined distance and/or angle relative to a particular point and/or structure of the vehicle (e.g., two feet from a back passenger side corner at an angle of approximately 45 degrees of planes defined along an exterior side and an exterior back of the vehicle). Using the determined package drop point, the delivery aircraft 102 can then deposit the package of one or more products at the determined package drop point.

The delivery aircraft determines its own location and/or uses images and/or video in delivering the package. The delivery aircraft uses the location detection system 210 in determining its location, which can include using beacon signals from one or more beacons 104 at known locations, global positioning satellite (GPS) coordinate information received at the delivery aircraft, sensor data (e.g., inertial sensors, gyroscope, accelerometer, altimeter, distance measurement systems, etc.). In some embodiments, the delivery system 100 includes a series of fixed beacons 104 that are positioned at specific and know locations that are proximate the one or more drive-through stations. Typically, the system includes at least three beacons that generate predefined beacons signals. The delivery aircraft can include one or more beacon detectors 222 that detect the one or more beacon signals from one or more of the series of beacons. The location detection system can include and/or couple with the beacon detector 222, a global positioning satellite (GPS) system 224 that obtains and/or utilizes global positioning satellite (GPS) coordinate information, one or more sensors, other such data, and typically a combination of two or more of such detection systems. In some embodiments, the location detection system continuously and autonomously determines a precise location of the delivery aircraft utilizing the predefined beacon signals when the beacon signals are detected. In some instances, the delivery aircraft receives global positioning information corresponding to a current location of the delivery aircraft, and the location detection system utilizes the global positioning information in cooperation with the beacon signals in continuously and autonomously determines the precise location of the delivery aircraft. The control circuit 202 utilizes a known predefined global position of the drive-through station relative to the determined precise location of the delivery aircraft in controlling movement and routing of the delivery aircraft to the drive-through station and to maintain a position of the delivery aircraft while hovering above the vehicle while delivering the package to the package drop point.

As introduced above, the delivery of the package can be by the delivery aircraft lowering to the drop point to deposit the package, lowering the package through a crane system, and/or other such methods. For example, in some embodiments, the delivery aircraft includes a crane system 216 that supports a package and lowers the package to the package drop point relative to the current location and orientation of the vehicle while the delivery aircraft hovers above the vehicle by a threshold distance.

During delivery one or more safety precautions can be take and/or rules can be evaluated in attempts to ensure that people and/or pets are not injured and that the products are delivered without damage. In some implementations, the image processor 220 of the delivery aircraft 102 and/or the image processor 108 of the delivery control system 106 continue to evaluation images and/or video relative to one or more rules, such as detecting movement within a threshold distance of the determined package drop point, detecting movement of the vehicle, and the like. Similarly, other information can be evaluated while delivering the package, such as but not limited to communications from the customer (e.g., through the station communication system 114, from a customer's user interface unit 122, and/or other such communications), monitoring environmental conditions (e.g., wind speed, rain, etc.), operating conditions of the delivery aircraft, and the like. For example, in some embodiments, the delivery aircraft and/or delivery control system confirm there are no humans within a threshold distance of the package drop point (e.g., shape recognition, facial recognition, etc.). This can include image processing one or more of the images captured prior to and/or while the crane system is lowering the package and confirming there are no detected humans outside the vehicle and within a threshold distance of the package drop point. The control circuit 202 can activate the crane system 216 to lower the package after confirming there are no detected humans outside the vehicle and within a threshold distance of the package drop point.

Other conditions may be evaluated prior to and/or during delivery, such as a condition of the drop point. Again, in some instances, the drop point may be on or in the vehicle. For example, in some instances the package drop point is in the trunk of the vehicle. As such, the delivery aircraft and/or the delivery control circuit may confirm the trunk is open prior to initiating the delivery. For example, the shopping facility image processor 108 can further be configured to confirm the package drop point is open and accessible to receive the package based on the processing of the additional images from the shopping facility cameras 118 and/or images from the delivery aircraft. This processing may include, for example, a comparison of at least two images of the vehicle at the drive-through station that are captured at different times (e.g., separated by at least a threshold period of time). For example, the comparison can identify that the difference between the later captured image and the earlier captured image shows the trunk is open. Similarly, image processing of images from one or more shopping facility cameras 118 and/or images from the delivery aircraft 102 can be compared with an image of the same type of vehicle that is at the drive-through station that has the trunk open. Additionally or alternatively, image processing of images from one or more shopping facility cameras 118 and/or images from the delivery aircraft 102 can be evaluated to detect a void, dark patch, a difference in color, other such distinctions or combinations of two or more of such distinctions that are in an expected location where the trunk should been.

Further, in some embodiments the delivery control system 106 of the shopping facility activates the delivery aircraft to implement a product delivery. Again, the delivery control system 106 is separate and distinct from the delivery aircrafts 102 and in communication with the delivery aircrafts. In some instances, the control system may receive a notification that a vehicle has entered and/or parked in a drive-through station. For example, some embodiments include one or more vehicle detection systems 112 at the shopping facility configured to detect the presence of a vehicle at one or more of the drive-through stations and communicate a vehicle notification to the delivery control system triggering the activation of the delivery aircraft. This notification may be based on a customer pressing a button and/or activating the station communication system 114, one or more sensors communicating relevant detected data (e.g., weight, optical, image processing, movement, other such sensors or combination of two or more of such sensors). For example, the vehicle detection system 112 may include one or more sensors to determine and/or provide information to be used in determining a precise location and/or orientation of the vehicle relative to the drive-through station. Such sensors may include, but are not limited to one or more distance measurement sensors, an array of weight sensors, other such sensors or a combination of two or more of such sensors. Additionally or alternatively, some embodiments may detect a user interface unit at a drive-through station and/or crossing a virtual geographic fence proximate the shopping facility and/or the drive-through stations (e.g., based on cellular tracking, detecting the user interface through a local and/or limited distance wireless communication network (e.g., Wi-Fi), etc.).

Further, the delivery control system may receive communications through a transceiver that includes an identifier and/or identifying information of a customer and/or order corresponding to the vehicle. This communication may be through a station communication system 114 that is implemented at the drive-through stations, from a customer's user interface unit 122, other such communications, or combination of two or more of such communications. The identification may be determined from the customer logging in to an account, receiving customer information from a card (e.g., credit card, frequent customer card, etc.) that is inserted into the station communication system 114, based on a phone number or other identifier of the user interface unit being used by the customer, other such methods or a combination of two or more of such methods. Based on the determined identification of the customer, the delivery control system can identify the one or more packages that include one or more products to be delivered to the vehicle. The delivery control system can then activate one or more of the delivery aircrafts 102 to deliver the package/s to the package drop point corresponding to the location of the vehicle within the drive-through station in response to the detection of the vehicle at the drive-through station. In some applications, the delivery control circuit determines whether one or more delivery aircraft are available and/or can schedule the delivery of the one or more packages to the corresponding drive-through station. A response and/or notification can be communicated to the customer (e.g., via the station communication system 114, user interface unit 122, or the like) with information about the delivery, such as but not requiring or limited to an identification of the one or more products to be delivered to the vehicle, an estimated time of delivery, a notification of one or more additional products that may correspond to one or more products being delivered to the vehicle and/or one or more additional products that the customer may be interested in, often purchases (e.g., based on an evaluation of a customer profile) and/or is on sale, and other such information.

Figure 3:
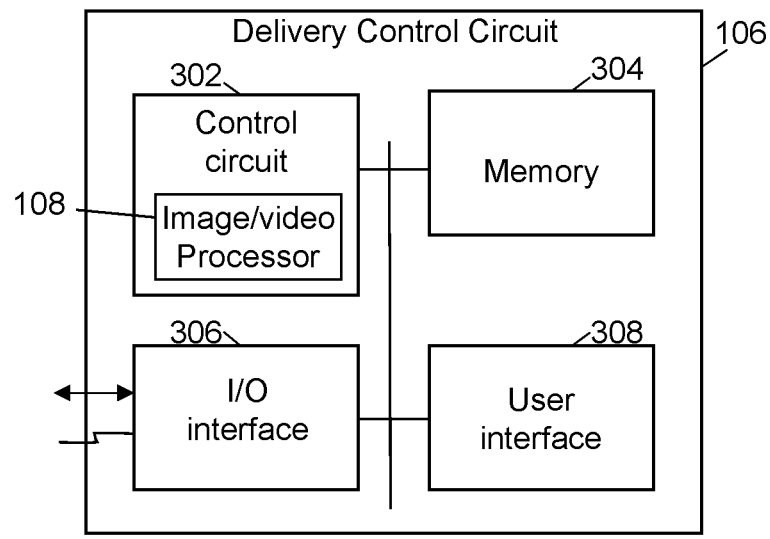
FIG. 3 illustrates a simplified block diagram of an exemplary delivery control system, in accordance with some embodiments.

FIG. 3 illustrates a simplified block diagram of an exemplary delivery control system 106, in accordance with some embodiments. The delivery control system 106 includes one or more control circuits 302, memory 304, and input/output (I/O) interfaces and/or devices 306. Some embodiments further include one or more user interfaces 308. The control circuit 302 typically comprises one or more processors and/or microprocessors. Further, the delivery control circuit and/or the control circuit 302 can include one or more image processors 108. The memory 304 stores the operational code or set of instructions that is executed by the control circuit 302 and/or processor to implement the functionality of the delivery control system 106. In some embodiments, the memory 304 may also store some or all of particular data that may be needed to identify a customer, identify one or more products and/or packages to be delivered to the customer at a drive-through station, activate a delivery aircraft in initiating a delivery to a drive-through station, identify a vehicle, determine whether a trunk or other storage area is open, determine flight paths, cause flight paths and/or flight instructions to be communicated to the unmanned delivery aircraft 102, and make other associations, determinations, measurements and/or communications described herein. Such data may be pre-stored in the memory, received from an external source (e.g., delivery aircraft, database 124, aircraft facility 116, user interface units 122, etc.), be determined, and/or communicated to the delivery control system.

It is understood that the control circuit 302, processors and/or image processor/s 108 may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Although the memory 304 is shown as internal to the delivery control system 106, the memory 304 can be internal, external or a combination of internal and external memory. While FIG. 3 illustrates the various components being coupled together via a bus, it is understood that the various components may actually be coupled to the control circuit 302 and/or one or more other components directly.

Further, the control circuit 302 and/or electronic components of the delivery control system 106 can comprise fixed-purpose hard-wired platforms or can comprise a partially or wholly programmable platform. These architectural options are well known and understood in the art and require no further description here. The delivery control system and/or control circuit can be configured (for example, by using corresponding programming as will be well understood by those skilled in the art) to carry out one or more of the steps, actions, and/or functions described herein. In some implementations, the control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the delivery control system 106 to external components, such as the unmanned delivery aircraft 102, a shopping facility system or systems (e.g., inventory system, point-of-sale (POS) system, etc.), station communication system 114, vehicle detection system 112, beacons 104, cameras 118, aircraft facility system, databases 124, and other such devices or systems. Typically, the I/O interface 306 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

In some implementations, the delivery control circuit includes one or more user interfaces 308 that may be used for user input and/or output display. For example, the user interface 308 may include any known input devices, such one or more buttons, knobs, selectors, switches, keys, touch input surfaces, audio input, and/or displays, etc. Additionally, the user interface 308 include one or more output display devices, such as lights, visual indicators, display screens, etc. to convey information to a user/worker, such as but not limited to product orders, product information, delivery aircraft identifier information, flight path mapping, flight path information, delivery aircraft parameter data, customer information, images, video, communication information (e.g., text messages, emails, etc.), status information, mapping information, operating status information, notifications, errors, conditions, and/or other such information. Similarly, the user interface 308 in some embodiments may include audio systems that can receive audio commands or requests verbally issued by a worker, and/or output audio content, alerts and the like.

Figure 4:
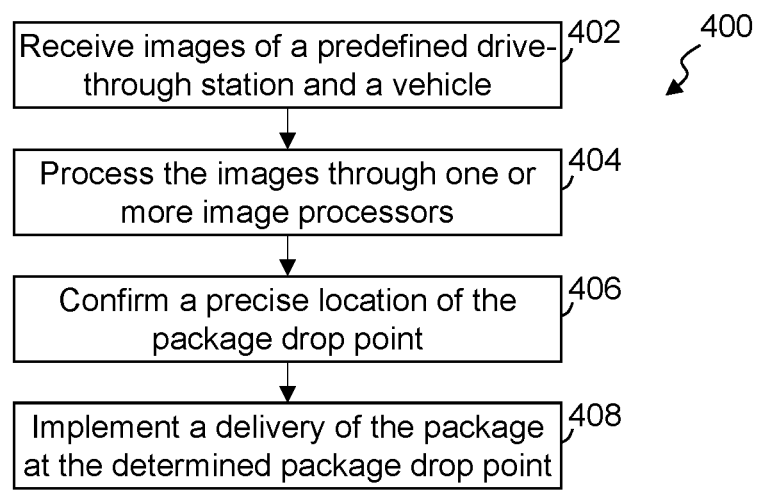
FIG. 4 illustrates a simplified flow diagram of an exemplary process of delivering a product to a package drop point using an unmanned delivery aircraft, in accordance with some embodiments.

FIG. 4 illustrates a simplified flow diagram of an exemplary process 400 of delivering a product to a package drop point using an unmanned delivery aircraft 102, in accordance with some embodiments. In step 402, receive images of at least a predefined drive-through station and a vehicle waiting at the drive-through station from one or more cameras of an unmanned delivery aircraft 102 that is configured to carry at least one or more packages to be delivered to a package drop point corresponding to a location of the vehicle at the predefined drive-through station associated with a shopping facility. In some applications the one or more cameras of the delivery aircraft are activated when the delivery aircraft is above the drive-through station. Further, in some embodiments, the delivery aircraft may implement a flight sequence that can include flying above the drive-through station at least at a threshold elevation above the drive-through station, and around the drive through station one or more times at one or more radii while capturing images and/or video.

The delivery aircraft 102 can track its location in controlling its flight and delivering the package. Beacon information, antenna triangulation information, image processing, GPS information, other such information, or a combination of two or more of such information can be utilized by the delivery aircraft and/or the delivery control system 106 in determining and tracking the delivery aircraft's location. In some embodiments, one or more beacons 104 are positioned at various known locations at and/or around the shopping facility. In some instances a beacon detector 222 on the delivery aircraft detect one or more beacon signals from one or more of a series of fixed beacons 104 positioned at specific and know locations that are proximate the drive-through stations. Additionally or alternatively, the delivery aircraft 102 may include a global positioning satellite system 224 that receives global positioning information corresponding to a current location of the delivery aircraft. The delivery aircraft (e.g., through the location detection system 210) and/or the delivery control system can continuously and autonomously determine a precise location of the delivery aircraft utilizing the predefined beacon signals when the beacon signals are detected, and/or utilizing the global positioning information. In some implementations, the global positioning information is used in cooperation with the beacon signals in determining and/or tracking a precise location of the delivery aircraft at least relative to the one or more drive-through stations.

In step 404, the images are processed through one or more image processors 220 of the delivery aircraft 102 and/or image processors 108 of the delivery control system 106. In step 406, a precise location of the package drop point is confirmed, based on the processing of the images, as defined according to a determined current location and an orientation of the vehicle. As described above, in some implementations the package drop point may be part of, in and/or fixed to the vehicle (e.g., trunk, truck bed, car top carrier, etc.). The processing of the images in confirming the precise location of the package drop point can include confirming a determined location of the package drop point that is fixed to the vehicle Accordingly, the location of the vehicle can be determined, and the corresponding drop point on, in or fixed to the vehicle can be determined, for example based on dimensions specifications of the vehicle (e.g., stored in the memory 204, database, 124, delivery control system 106, remotely obtained (e.g., via the Internet), or the like). In some embodiments, the image processing allows the delivery aircraft 102 and/or the delivery control system 106 to identify at least a type of vehicle (e.g., manufacturer, and model, and potentially a year or range of years of manufacture). Once the vehicle is identified, specifications of the vehicle (e.g., dimensions, location of a trunk, etc.) can be obtained and used in determining the package drop point.

Some embodiments utilize fixed shopping facility cameras 118 in identifying a location and/or orientation of vehicle. As such, the delivery control system 106 and/or the control circuit 202 of the delivery aircraft may receive additional images from one or more shopping facility cameras. For example, a shopping facility image processor 108 may receive additional images from one or more shopping facility cameras orientated to capture the additional images of the drive-through station, and the delivery control system can determine a location and orientation of the vehicle based on the image processing. The determined vehicle location and orientation information can be communicated to the delivery aircraft to be used in determining and/or confirming a package drop point and in delivering the package.

Still referring to FIG. 4, in step 408, the delivery aircraft 102 implements a delivery of the package at the determined package drop point. As described above, the delivery can include lowering the delivery aircraft, activating a lowering system (e.g., a crane system 216), other such methods, or a combination of two or more of such methods. In some embodiments, the control circuit 202 and/or a crane control circuit controls a crane system 216 of the delivery aircraft to lower one or more packages to the package drop point relative to the current location and orientation of the vehicle while the delivery aircraft hovers above the vehicle by a threshold distance. The control circuit 202 of the delivery aircraft can continue to receive location information and/or use sensor data in maintaining a position of the delivery aircraft during the lowering and delivery of the package. In some embodiments, the control circuit and/or motor control circuitry 208 can control one or more motors that drive one or more propellers to control the delivery aircraft utilizing the known predefined global position of the drive-through station relative to the determined precise location of the delivery aircraft in controlling movement and routing of the delivery aircraft to the drive-through station and to maintain a position of the delivery aircraft while hovering above the vehicle while delivering the first package into the package drop point. The delivery control system 106 can determine and communicate the flight route and/or path to the delivery aircraft, which can use positioning information to travel along the flight route. As such, the delivery system, in some embodiments, use GPS, beaconing technology, and video analytics to detect a vehicle and position the delivery aircraft to deliver a package safely to a package drop point corresponding to the current location of a customer's vehicle. Once a package is delivered, a customer may acknowledge receipt of the package (e.g., through the station communication system, user interface unit, etc.), and/or the customer leaving the drive-through station may be interpreted as the customer receiving the package unless otherwise notified.

While delivering the package, the control circuit 202 of the delivery aircraft and/or the control circuit 302 of the delivery control system 106 can continue to monitor one or more parameters and/or conditions at the drive-through station prior to and while the delivery aircraft is delivering the package. In some instances, the evaluation can include confirming the drop point on the vehicle is open (e.g., trunk is open). Some embodiments compare at least two of the additional images of the vehicle at the drive-through station and captured at different times separated by at least a threshold period of time, and confirm the package drop point is open and accessible to receive the package based on the comparing of the at least two additional images. Additionally, the evaluation can include confirming safety prior to and/or while delivering the package, such as confirming there are no humans within a threshold distance of the package drop point. This can include processing one or more images captured prior to controlling the crane system 216 to lower the package and confirming there are no detected humans outside the vehicle and within a threshold distance of the package drop point. The crane system can be activated to lower the package after confirming there are no detected humans outside the vehicle and within a threshold distance of the package drop point. Other factors may pause or abort a delivery, such as not being able to identify a package drop point, the package drop point not being accessible (e.g., trunk is open), and other such conditions. In some instances, the delivery aircraft and/or the delivery control system may contact the customer and request one or more actions be implemented to address the issue. Additionally or alternatively, a shopping facility worker may be notified. Once delivered, in some instances, the delivery aircraft and/or the delivery control system may notify the customer (e.g., through the station communication system 114, the customer's user interface unit 122, and the like) that the delivery is complete and that is safe for the customer to leave.

Further, in some embodiments, the delivery control system of the shopping facility can activate one or more delivery aircrafts to delivery products to customers and predefined drive-through locations. The delivery control system can receive a communication identifying a customer corresponding to the vehicle. Based on the identified customer, the control circuit 302 can identify and/or obtain an identification of one or more packages or products to be delivered to the vehicle. The control circuit 302 can activate one or more delivery aircrafts to deliver the one or more packages to the package drop point corresponding to the location of the vehicle within the drive-through station in response to a detection of the vehicle at the drive-through station. Some embodiments include a vehicle detection system 112 detects the presence of the vehicle at the drive-through station, and communicates a vehicle notification to the delivery control system triggering, which in part can cause the activation of the delivery aircraft.

In some embodiments, systems, apparatuses and methods are provided the delivery of packages and/or cargo through the use of unmanned delivery aircrafts. In some embodiments, a product delivery system is provided that comprises: an unmanned delivery aircraft configured to carry at least a first package to be delivered to a package drop point corresponding to a location of a vehicle at a predefined drive-through station associated with a shopping facility, wherein the delivery aircraft comprises: one or more cameras positioned to capture images of at least the drive-through station and the vehicle waiting at the drive-through station when the unmanned delivery aircraft is above the drive-through station; an image processor configured to process images captured by the one or more cameras and based on the processing of the images confirm a precise location of the package drop point as defined according to a determined current location and an orientation of the vehicle; and a crane system that supports the first package and lowers the first package to the package drop point relative to the current location and orientation of the vehicle while the delivery aircraft hovers above the vehicle by a threshold distance.

Some embodiments provide methods of delivering a products, comprising: receiving images of at least a predefined drive-through station and a vehicle waiting at the drive-through station from one or more cameras of an unmanned delivery aircraft that is configured to carry at least a first package to be delivered to a package drop point corresponding to a location of the vehicle at the drive-through station associated with a shopping facility; processing the images through an image processor of the delivery aircraft; confirming, based on the processing of the images, a precise location of the package drop point as defined according to a determined current location and an orientation of the vehicle; and controlling a crane system of the delivery aircraft to lower the first package to the package drop point relative to the current location and orientation of the vehicle while the delivery aircraft hovers above the vehicle by a threshold distance.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A product delivery system, comprising:
   an unmanned delivery aircraft configured to carry at least a first package to be delivered to a package drop point corresponding to a location of a vehicle at a predefined drive-through station associated with a shopping facility, wherein the delivery aircraft comprises:
   one or more cameras positioned to capture images of at least the drive-through station and the vehicle waiting at the drive-through station when the unmanned delivery aircraft is above the drive-through station;
   an image processor configured to process images captured by the one or more cameras and based on the processing of the images confirm a precise location of the package drop point as defined according to a determined current location and an orientation of the vehicle; and
   a crane system that supports the first package and lowers the first package to the package drop point relative to the current location and orientation of the vehicle while the delivery aircraft hovers above the vehicle by a threshold distance.

2. The product delivery system of claim 1, wherein the image processor in confirming the precise location of the package drop point comprises confirming the determined location of the package drop point that is fixed to the vehicle.

3. The product delivery system of claim 1, further comprising:
   a series of fixed beacons positioned at locations that are proximate to the drive-through station, wherein three beacons generate predefined beacons signals;
   wherein the delivery aircraft further comprises:
   a beacon detector that detects one or more beacon signals from one or more of the series of beacons; and
   a location detection system coupled with the beacon detector, wherein the location detection system continuously and autonomously determines a precise location of the delivery aircraft utilizing the predefined beacon signals when the beacon signals are detected.

4. The product delivery system of claim 3, wherein the delivery aircraft further comprises:
   a global positioning satellite system, wherein the global positioning satellite system receives global positioning information corresponding to a current location of the delivery aircraft, wherein the location detection system utilizes the global positioning information in cooperation with the beacon signals in continuously and autonomously determining the precise location of the delivery aircraft; and
   a control circuit configured to utilize a known predefined global position of the drive-through station relative to the determined precise location of the delivery aircraft in controlling movement and routing of the delivery aircraft to the drive-through station and to maintain a position of the delivery aircraft while hovering above the vehicle while delivering the first package into the package drop point.

5. The product delivery system of claim 1, wherein the image processor is further configured to process one or more of the images captured prior to the crane system lowering the first package and confirm there are no detected humans outside the vehicle and within a threshold distance of the package drop point; and
   a control circuit coupled with the crane system and configured to activate the crane system to lower the first package after confirming there are no detected humans outside the vehicle and within a threshold distance of the package drop point.

6. The product delivery system of claim 1, further comprising:
one or more shopping facility cameras orientated to capture additional images of the drive-through station; and
a shopping facility image processor configured to receive the additional images captured by the one or more shopping facility cameras, determine the current location and orientation of the vehicle, and communicate the determined current location and orientation information of the vehicle to the delivery aircraft.

7. The product delivery system of claim 6, wherein the shopping facility image processor is further configured to confirm the package drop point is open and accessible to receive the first package based on the processing of the additional images through a comparison of at least two additional images of the vehicle at the drive-through station that are captured at different times separated by at least a threshold period of time.

8. The product delivery system of claim 1, further comprising:
a delivery control system that is separate and distinct from the delivery aircraft and in communication with the delivery aircraft, wherein the delivery control system comprises a transceiver that receives a communication identifying a customer corresponding to the vehicle; the delivery control system identifies the first package is to be delivered to the vehicle based on the identified customer, and activates the delivery aircraft to deliver the first package to the package drop point corresponding to the location of the vehicle within the drive-through station in response to a detection of the vehicle at the drive-through station.

9. The product delivery system of claim 8, further comprising:
a vehicle detection system at the shopping facility configured to detect a presence of the vehicle at the drive-through station and communicate a vehicle notification to the delivery control system triggering the activation of the delivery aircraft.

10. A method of delivering a product, comprising:
receiving images of at least a predefined drive-through station and a vehicle waiting at the drive-through station from one or more cameras of an unmanned delivery aircraft that is configured to carry at least a first package to be delivered to a package drop point corresponding to a location of the vehicle at the drive-through station associated with a shopping facility;
processing the images through an image processor of the delivery aircraft;
confirming, based on the processing of the images, a precise location of the package drop point as defined according to a determined current location and an orientation of the vehicle; and
controlling a crane system of the delivery aircraft to lower the first package to the package drop point relative to the current location and orientation of the vehicle while the delivery aircraft hovers above the vehicle by a threshold distance.

11. The method of claim 10, wherein processing the images and confirming the precise location of the package drop point comprises confirming the determined location of the package drop point that is fixed to the vehicle.

12. The method of claim 10, further comprising:
detecting, through a beacon detector on the delivery aircraft, one or more beacon signals from one or more of a series of fixed beacons positioned at locations that are proximate to the drive-through station;
continuously and autonomously determining, through a location detection system of the delivery aircraft, a precise location of the delivery aircraft utilizing the predefined beacon signals when the beacon signals are detected.

13. The method of claim 12, wherein the determining the precise location of the delivery aircraft further comprises:
receiving, through a global positioning satellite system of the delivery aircraft, global positioning information corresponding to a current location of the delivery aircraft;
wherein the continuously and autonomously determining the precise location of the delivery aircraft comprises determine the precise location utilizes the global positioning information in cooperation with the beacon signals; and
controlling the delivery aircraft utilizing a known predefined global position of the drive-through station relative to the determined precise location of the delivery aircraft in controlling movement and routing of the delivery aircraft to the drive-through station and to maintain a position of the delivery aircraft while hovering above the vehicle while delivering the first package into the package drop point.

14. The method of claim 10, further comprising:
processing images captured prior to controlling the crane system to lower the first package and confirming there are no detected humans outside the vehicle and within a threshold distance of the package drop point, wherein the controlling the crane system to lower the first package comprises activating the crane system to lower the first package after confirming there are no detected humans outside the vehicle and within a threshold distance of the package drop point.

15. The method of claim 10, further comprising:
receiving, at a shopping facility image processor, additional images from one or more shopping facility cameras orientated to capture the additional images of the drive-through station;
determining the current location and orientation of the vehicle, and
communicating the determined current location and orientation information to the delivery aircraft.

16. The method of claim 15, further comprising:
comparing at least two of the additional images of the vehicle at the drive-through station that are captured at different times separated by at least a threshold period of time; and
confirming the package drop point is open and accessible to receive the first package based on the comparing of the at least two additional images.

17. The method of claim 10, further comprising:
receiving, at a delivery control system that is separate and distinct from the delivery aircraft, a communication identifying a customer corresponding to the vehicle;
identifying the first package is to be delivered to the vehicle based on the identified customer; and
activating the delivery aircraft to deliver the first package to the package drop point corresponding to the location of the vehicle within the drive-through station in response to a detection of the vehicle at the drive-through station.

18. The method of claim 17, further comprising:
detecting a presence of the vehicle at the drive-through station; and
communicating a vehicle notification to the delivery control system triggering the activation of the delivery aircraft.

* * * * *